Sept. 20, 1938.                      C. E. MILLER                        2,130,809
                          MULTIPLE SPINDLE AUTOMATIC LATHE
                            Filed April 3, 1937            8 Sheets-Sheet 5

Fig. 7.

Inventor
Carroll E. Miller
by Wright Brown Quinby
 & May
Attys

Sept. 20, 1938.  C. E. MILLER  2,130,809
MULTIPLE SPINDLE AUTOMATIC LATHE
Filed April 3, 1937  8 Sheets-Sheet 7

Patented Sept. 20, 1938

2,130,809

UNITED STATES PATENT OFFICE 2,130,809

MULTIPLE SPINDLE AUTOMATIC LATHE

Carroll E. Miller, Windsor, Vt., assignor to Cone Automatic Machine Company, Inc., Windsor, Vt., a corporation of Vermont Application April 3, 1937, Serial No. 134,781

19 Claims. (Cl. 29—37)

This invention relates to multiple spindle automatic lathes and has for one object to make certain improvements applicable particularly, though some not restricted thereto, to machines of the general type disclosed in the patent of Frank L. Cone No. 1,934,620 granted November 7, 1933. One of these improvements comprises an auxiliary power feed for advancing and retracting the controlling cam shaft at the will of the operator so as to relieve the operator from the necessity of turning the machine over by hand, which, particularly in the large machines, is laborious. This auxiliary power feed control is of great utility, particularly in setting up the machine for performing a desired series of operations.

Other features of the invention have for their particular objects the rendering of the various parts more accessible for adjustment or repairs than in prior constructions, and to otherwise improve the design of the machine.

For a more complete understanding of this invention, reference may be had to the accompanying drawings in which.

Figure 1:
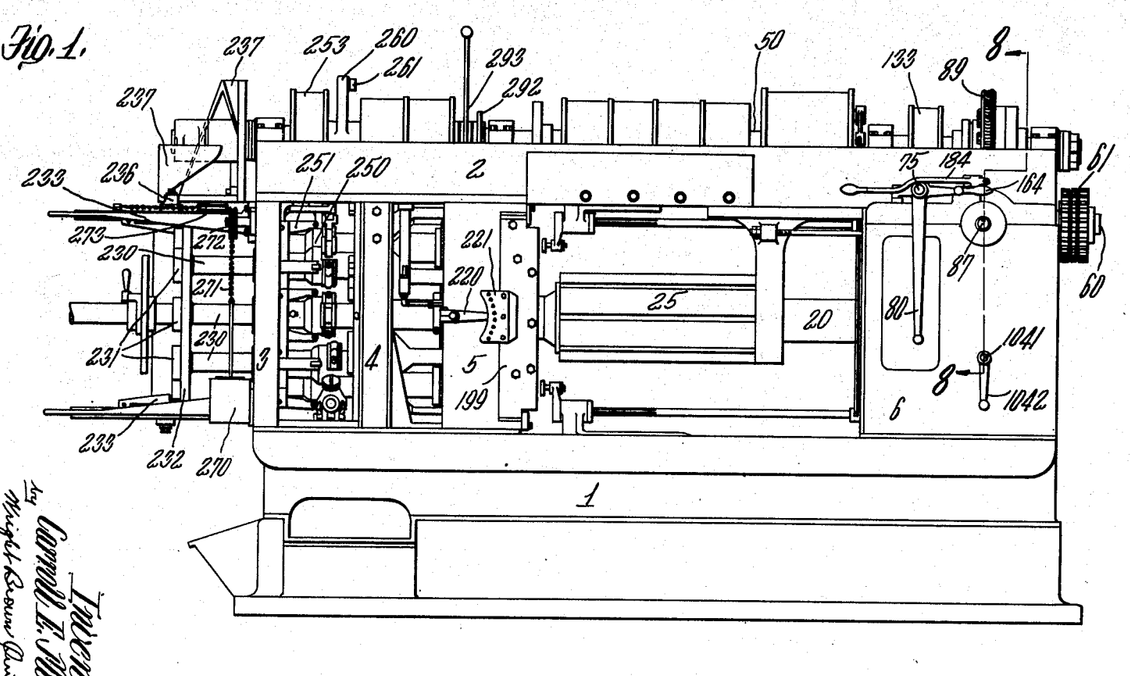
Figure 1 is a side elevation of a machine embodying the invention.

As shown best in Figure 1, the machine in which this invention is shown as embodied comprises a lower bed 1, an upper bed frame 2, and frame members 3, 4, 5 and 6 joining these frames.

Inwardly of the frame members 4 and 5 is positioned a carrier or drum 10 in which are arranged in circular array a plurality of work-carrying spindles 11. Extending axially of the drum is a spindle drive shaft 15, and as shown best in Figure 4, the individual spindles 11 are rotated by rotation of this drive shaft 15 through a gear 16 keyed to this shaft 15 and meshing with gears 17 on each of the spindles. This shaft 15 extends through a sleeve 20, which at its inner end, is secured to the end plate 21 of the spindle-carrying drum, and at its other end it is journaled in the end frame member 22 of the support 6. This sleeve 20 serves to support a cylindrical slide 25 (see Figures 4 and 6) to which may be secured tool holders 26, as shown there being one tool holder for each of the spindles, eight of each being herein shown, although more or less of these might be employed as desired. These tool holders 26 are shown as provided with securing bolts 27, the nuts 28 therefor riding in undercut grooves 29 in the periphery of the slide 25.

Figure 4:
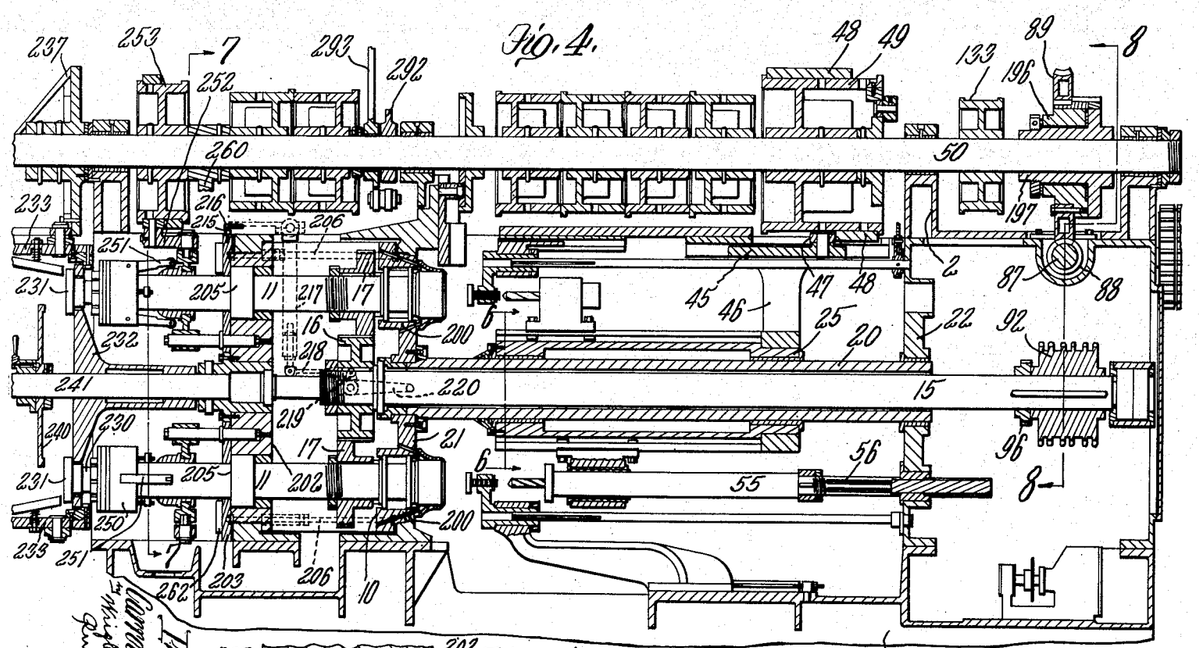
Figure 4 is a central vertical longitudinal section through the axes of the turret and cam shaft on line 4—4 of Figure 2.
Figure 6:
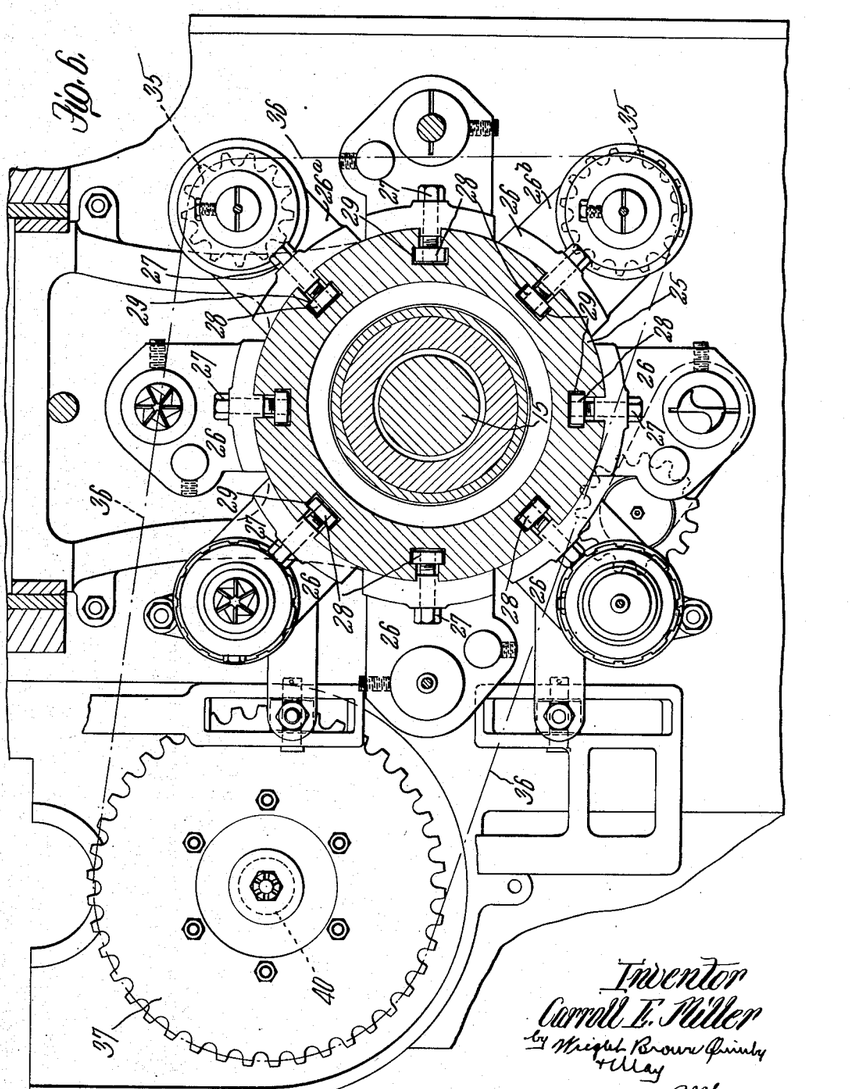
Figure 6 is a detail section on line 6—6 of Figure 4, but to a larger scale and showing a typical tool set-up.

Any desired type of tools may be supported by these tool carriers, a typical set-up being illustrated in Figure 6. Some of these tools it may be desired to rotate, and as shown in Figure 6, tools of this character are indicated at the holders 26a and 26b. Such tools may be mounted on rotary carriers provided with sprocket wheels 35. A driving sprocket chain 36 is shown as passing about these sprocket wheels and about a driving sprocket wheel 37 which may be carried at the end of a jack shaft 40. This shaft is driven by means which will later be described. The tool holder 25 may be moved axially of the shaft 15 toward and from work supported by the work spindles 11, and for this purpose there is shown in Figure 4 a slide 45 supported by the upper frame member 2. This slide 45 is provided with a depending arm 46 which is engaged with the rear end of the slide 25. On its upper face the slide 45 carries a cam follower 47 which is actuated by cams 48 on a cam drum 49. This drum is secured to a cam shaft 50 journaled in the top frame member 2 and arranged parallel to the shaft 15 and the axis of the turret.

Where it is desired to rotate the tools the shaft which carries such tools may be made in relatively slidable collapsing sections such as 55 and 56 as shown in Figure 4, and the driving sprocket wheel may be secured to the axially fixed section 56 so that the tool may be moved as the slide 25 is moved toward or from the work spindles.

Machine drive

Figures 9, 10, 11:
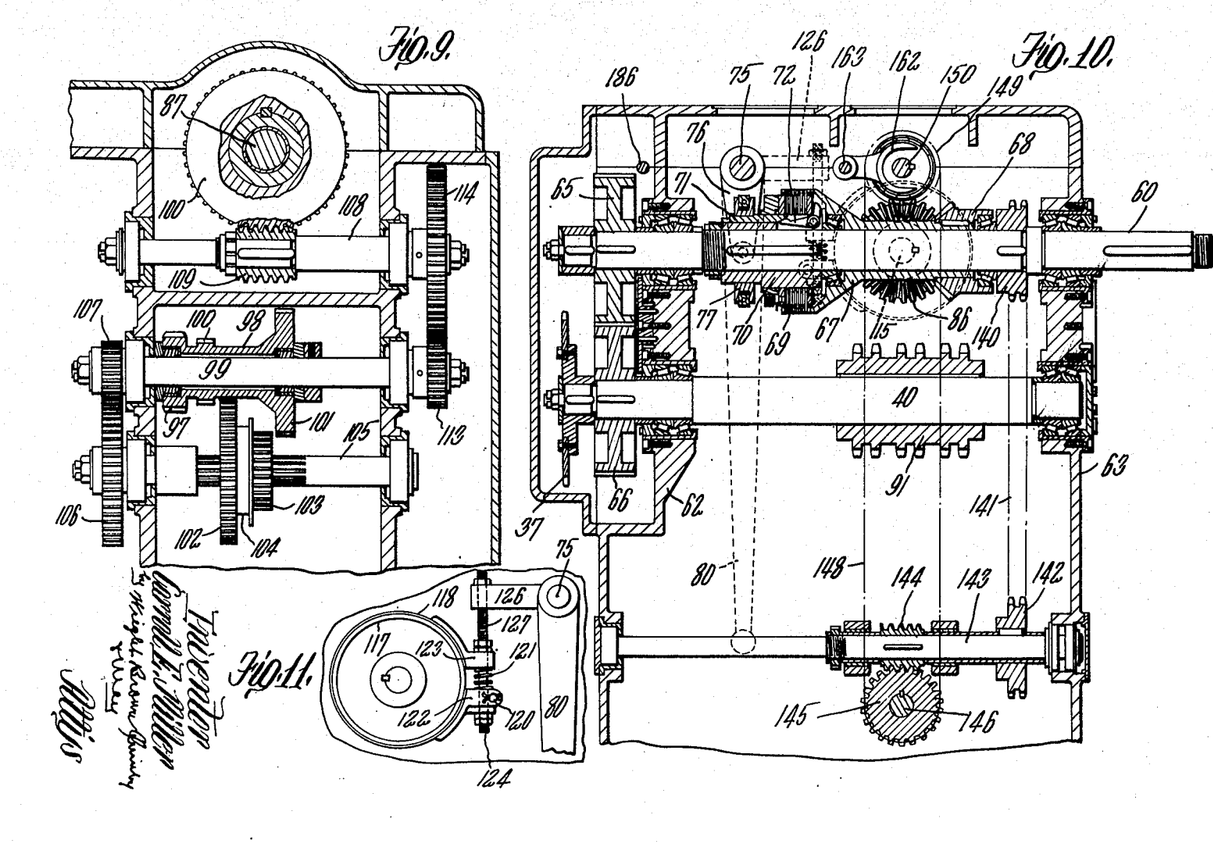
Figures 9 and 10 are cross sectional views on the correspondingly numbered sectional lines of Figure 8.
Figure 11 is a fragmentary elevation of the machine showing a brake mechanism.

The various mechanisms of the machine, including the cam shaft 50, and the spindle drive shaft 15, may be driven from any suitable source of power through the main drive shaft 60, which is shown in Figure 1 as having a pulley 61 thereon adapted to receive a chain belt from a motor, or countershaft, or the like. This shaft 60 is journaled in opposite walls 62 and 63 of the frame member 6 and the jack shaft 40 is arranged beneath the drive shaft 60 as shown best in Figure 10. The drive shaft 60 and the jack shaft 40 are geared together through change gears 65 and 66. The shaft 60, also, has journaled thereon a sleeve 67 to one end of which is secured a bevel gear 68 and the sleeve 67 may be clutched to rotate with the shaft 60 as by a clutch 69, one portion of which is carried by the sleeve 67 and the other portion of which is carried by a sleeve 70 keyed to the shaft 60. This sleeve 70 also carries the clutch-actuating fingers 71 which are slidable into and out of engagement with the clutch-actuating levers 72, so that as the fingers 71 are moved toward the right, as shown in Figure 10, the clutch is closed, while as they are moved to the left the clutch is allowed to open. This clutch is controlled through the rocking of a rock shaft 75 which carries an arm 76 engaging in an axially movable clutch-actuating ring 77 engaging notches in the fingers 71. On each of the forward and back faces of the machine the shaft 75 is provided with a main actuating handle 80. When the handle 80 is moved to close the clutch 72 the machine is being driven by power at its high idle speed.

Figure 8:
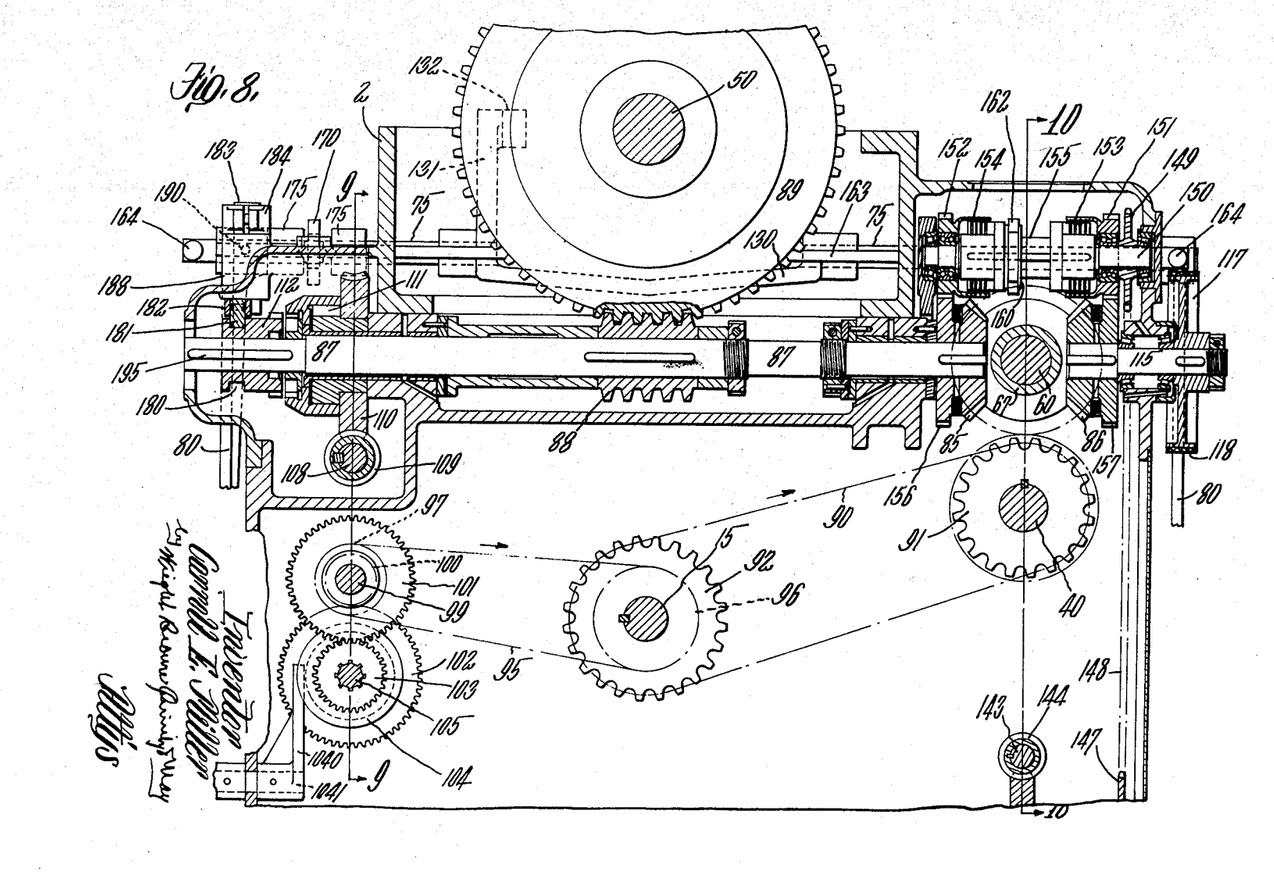

The gear 68 is arranged to mesh with a pair of bevel gears 85 and 86 (see Figures 8 and 10). The gear 85 is keyed to a cross worm shaft 87 on which is secured the worm 88, this worm meshing with a worm wheel 89 on the cam shaft 50. The jack shaft 40 is connected by a chain belt 90 to drive the spindle shaft 15, this chain belt engaging over multiple sprocket wheels 91 and 92 carried by these shafts, respectively. The high speed power drive thus passes from the shaft 60 through the clutch 72 and the gear 68 to the cam shaft 50 through the worm shaft 87 and the worm wheel 89.

The slow or working speed of the cam shaft is derived from the spindle shaft 15, driving through a chain belt 95 engaging a sprocket wheel 96 thereon with a sprocket wheel 97 on a sleeve 98 (see Figures 8 and 9) journaled on a shaft 99. This sleeve 98 carries a pair of gears 100 and 101, respectively, of different sizes with which may be selectively meshed gears 102 and 103, respectively, on a sleeve 104 slidably keyed to a countershaft 105 and this countershaft is connected through change gears 106 and 107 with the shaft 99, so that the shaft 99 can be driven at either one of two speeds for each set of change gears, depending on the axial position of the sleeve 104 relative to the sleeve 98. This axial position is controlled by the shifter arm 1040 secured to the rock shaft 1041 controlled by the hand shift lever 1042 (Figure 1) on the front of the machine. The shaft 99, through a pair of meshing gears 113 and 114, drives a power worm shaft 108 to which is secured a worm 109 meshing with a worm wheel 110 journaled on the cam shaft 87, and connected thereto through an overrunning roller clutch 111 and a positive clutch 112 (see Figure 8), so that when the shaft 75 is turned to close the clutch at 72, the worm shaft 87 may be driven at the higher rate of speed, notwithstanding the lower speed of rotation of the worm wheel 110, but when the clutch 72 is open, the shaft 87 and the cam shaft 50 will be driven at the lower speed through the low speed driving connections from the spindle shaft 15.

In order that the speed of rotation of the shaft 87 may be slowed down quickly when the high speed drive clutch 72 is opened so that the low speed drive can take charge, a brake mechanism is employed. This brake mechanism (Figures 8 and 11) comprises the brake shaft 115 to which the bevel gear 86 is secured, this bevel gear being driven from the same bevel gear 68 by which the shaft 87 is actuated. Outside of the machine frame this shaft 115 carries a brake drum 117 about which passes a brake band 118, which is shown best in Figure 11. This brake band has one end anchored, as at 120, and the other end spring pressed therefrom to normally hold the brake released as by a coil spring 121 placed between the brake drum ears 122 and 123. An actuating bolt 124 passes through these ears and on downward pressure of this bolt the ear 123 is pressed toward the ear 122 and thus tightens the brake band 118. Rocking of the shaft 75 in the direction to disconnect the clutch acts on further motion in the same direction through an arm 126 on the rod 124 to bring the head of a bolt 127 down against the bolt 124 so as to apply the brake when the clutch 72 has been opened.

Figures 12, 13, 14:
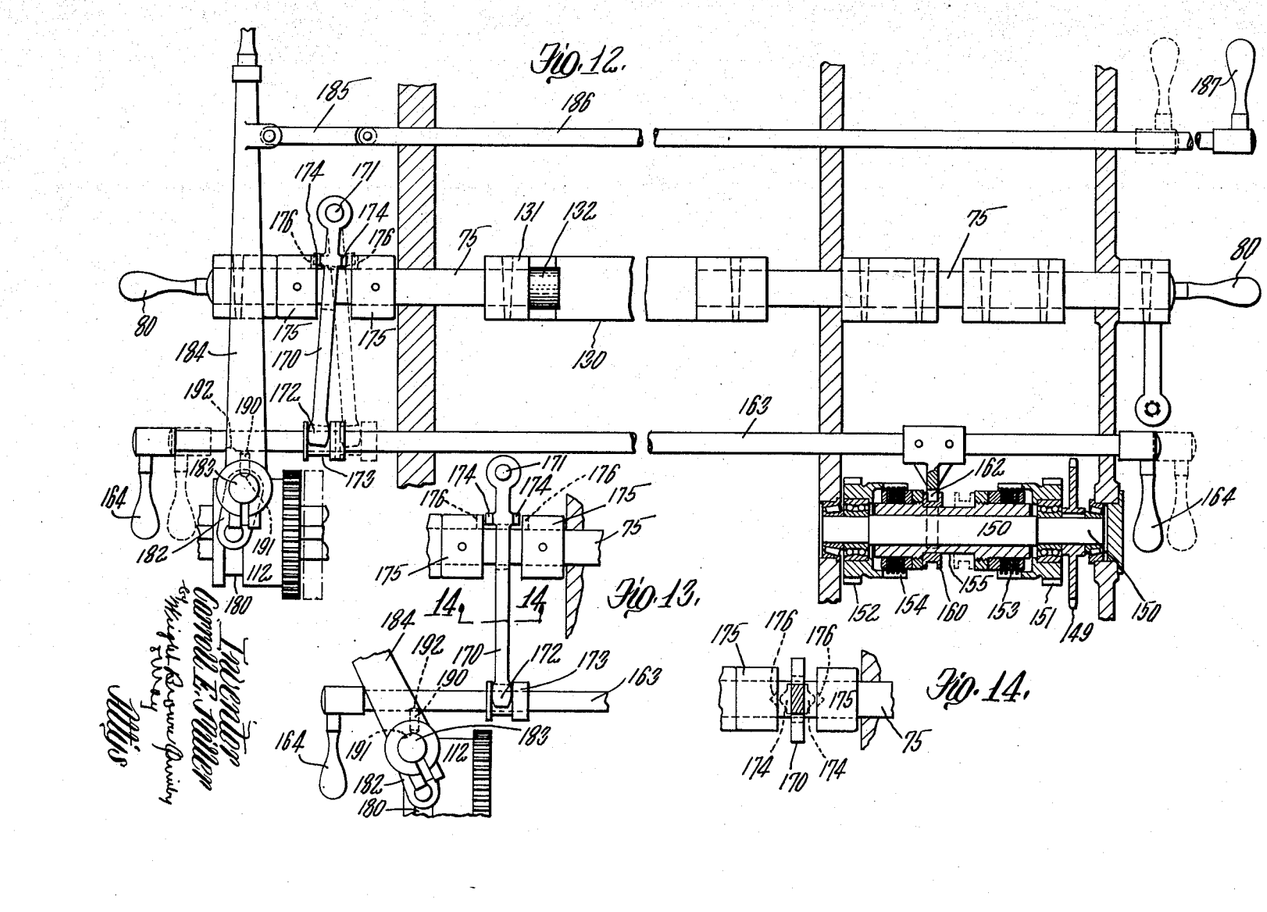
Figure 12 is a top plan view, with parts omitted, of the hand and power controls.
Figure 13 is a fragmentary view similar to a portion of Figure 12, but with parts in different positions.
Figure 14 is a detail view partly in elevation and partly in section on line 14—14 of Figure 13.

Besides the hand actuation of the high speed clutch to change between high and low speed drives of the cam shaft, this may be done by power. The shaft 75 is shown in Figures 8 and 12 as made in two end sections connected by a yoke 130, and this yoke 130 is provided with an arm 131 having a cam follower 132 actuated by suitable cams on a cam drum 133 secured to the cam shaft 50. These cams may act, when the clutch has been opened, to apply the brake to slow the cam shaft and then to release the brake without sufficient motion of the shaft 75 to again close the clutch.

Beside this normal power actuation of the cam shaft in the one direction only and at either a relatively high idle speed or a relatively low working speed, means are provided, in accordance with this invention, for driving the cam drum at an intermediate speed and in either direction, this drive being under the direct control of the operator by manual means. This drive comprises a sprocket wheel 140 keyed to the drive shaft 60 (see Figure 10), and which is connected through a chain belt 141 with a similar sprocket wheel 142 on a shaft 143. This shaft 143 has secured thereto a worm 144 which meshes with a worm wheel 145 on a shaft 146. This shaft 146 in turn carries a sprocket wheel 147 over which passes a chain belt 148 leading over a sprocket wheel 149 keyed to a shaft 150, which as shown in Figure 8, is positioned above the power feed cross shaft 87 and back of the cam shaft 50. On this shaft 150 is journaled a pair of gears 151 and 152 to which are secured the shell portions of a pair of clutches 153 and 154, the mating parts of which are secured to a sleeve 155 keyed to, but slidable axially of the shaft 150. When the clutch 154 is closed, the drive from the sprocket wheel 149 is through this clutch, the gear 152 and a gear 156 secured to the shaft 87. When this clutch is open and the clutch 153 is closed, the drive from the sprocket wheel 149 is through the clutch 153, the gear 151, a meshing gear 157 secured to the brake shaft 115, through the bevel gears 86, 68 and 85 to the shaft 87, so that the direction of drive of the shaft 87 when the clutch 153 is closed is in the reversed direction to that when the clutch 154 is closed. The speed of rotation of the cam shaft 50 is the same in either direction, the gears 156 and 157 and their mating gears 152 and 151, as shown, being of the same size. This sleeve 155 is controlled by hand, as shown best in Figure 12, being provided with a grooved collar 160 in which is engaged a yoke 162 carried by an axially shiftable rod 163. This rod extends on opposite sides of the machine and carries an actuating handle 164 on each end.

In the intermediate position of the sleeve 155 both clutches are disconnected and means are provided by which the throwing of either of the handles 80 into high speed driving position throws the sleeve 155 to this neutral position so that the operator is unable to throw in the hand-controlled intermediate speed while the machine is running at its fast speed. This interconnection, as shown, comprises an arm 170 fulcrumed at 171 (see Figures 12 and 13), and having an end portion 172 riding between end flanges of a spool 173 secured to the rod 163. This arm 170 is provided back from its end with a pair of oppositely disposed cam projections 174 which ride between a pair of cam collars 175 secured to the rock shaft 75. These collars 175 have oppositely disposed end recesses 176 and when the shaft 75 is in the angular position wherein the high speed clutch 72 is open, they come opposite to the cam lugs 174, so that the rod 163 may be moved freely in either direction from its neutral position, as shown, for example, between the dotted and full line position of Figure 12. If the shaft 75 be rocked out of this position to close the high speed clutch, however, the walls of one or the other of these recesses engages one or the other of the cam lugs 174 and moves the arm 170 to neutral position.

There is also an interlocking connection between the low or working speed driving mechanism and the manual control mechanism. Referring to Figures 8, 12, and 13, the clutch 112 in the low speed driving mechanism is provided with a peripheral groove 180 in which rides a shoe 181 carried by an arm 182 secured to a rock shaft 183. Also secured to this rock shaft is a control lever 184 which extends horizontally on the forward face of the machine as shown in Figure 1. To this arm 184 is secured, through a link 185 (see Figure 12), an actuating rod 186 provided with a handle 187 on its rear end and at the rear of the machine, so that the arm 182 may be actuated from either side of the machine. The rock shaft 183, as shown best in Figure 8, is journaled in a boss 188 and it carries slidable in a horizontal perforation therein a locking plug 190. This locking plug is in alinement with the rod 163 which is movable to control the manual power control mechanism. The rock shaft 183 is provided with a notch 191, which, when the arm 182 is in the position shown in Figure 12 with the clutch 112 open, is in angular position opposite to the plug 190, so that the plug end may enter therein as shown in Figure 12. The opposite end of the plug 190 is arranged to bear against the rod 163 and this rod 163 has a notch 192 therein which is in alinement with the plug 190 when the rod 163 is in its neutral position when both of the clutches 153 and 154 are open, as shown in Figure 13. When this rod 163 is in neutral position, therefore, the locking plug permits rocking of the shaft 183 from the position shown in Figure 12 to that shown in Figure 13, wherein the low speed power drive clutch 112 is closed. In this position of the parts the locking plug 190 bears on the periphery of the rock shaft 183 and locks the rod 163 in its neutral position. When the arm 185 is in unclutching position, as shown in Figure 12, the rod 163 may be moved in either direction from its neutral position to engage either selected of the clutches 153 and 154 so as to permit the machine to be turned over by power in either direction under the control of the operator, and at a speed intermediate the high idle speed and the low working speed. During the high idle speed and the low working speed, the cam shaft 50 is rotated under power, but always in the same direction. With the manual power control the cam shaft may be turned by power in either direction.

It is also possible to turn the cam shaft by hand, and for this purpose the forward end of the power feed cross shaft 87 has its key 195, which secures the clutch element 112 against rotation thereon, extended to permit the engagement therewith of a suitable hand wheel or actuating lever (not shown) which may be placed over the end of the shaft 87. As normally it will not be necessary to use this hand actuation in view of the fact that the cam shaft 50 may be turned over by power in either direction under manual control, no wheel or other operating means is shown in position on this shaft, but the provision of such means per se is well known in the art.

The drive for the cam shaft 50 may be provided with a safety shear device, as shown in Figure 4, the worm wheel 89 being secured to a hub member 196 yieldably held on a sleeve 197 keyed or otherwise secured to the cam shaft 50.

*Work spindle mechanism*

Figure 5:
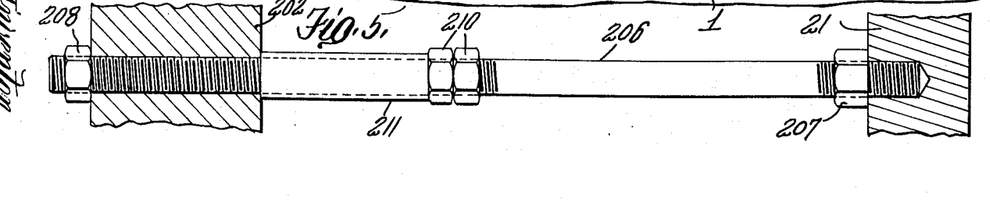
Figure 5 is a detail section to a larger scale on line 5—5 of Figure 7.
Figure 7:
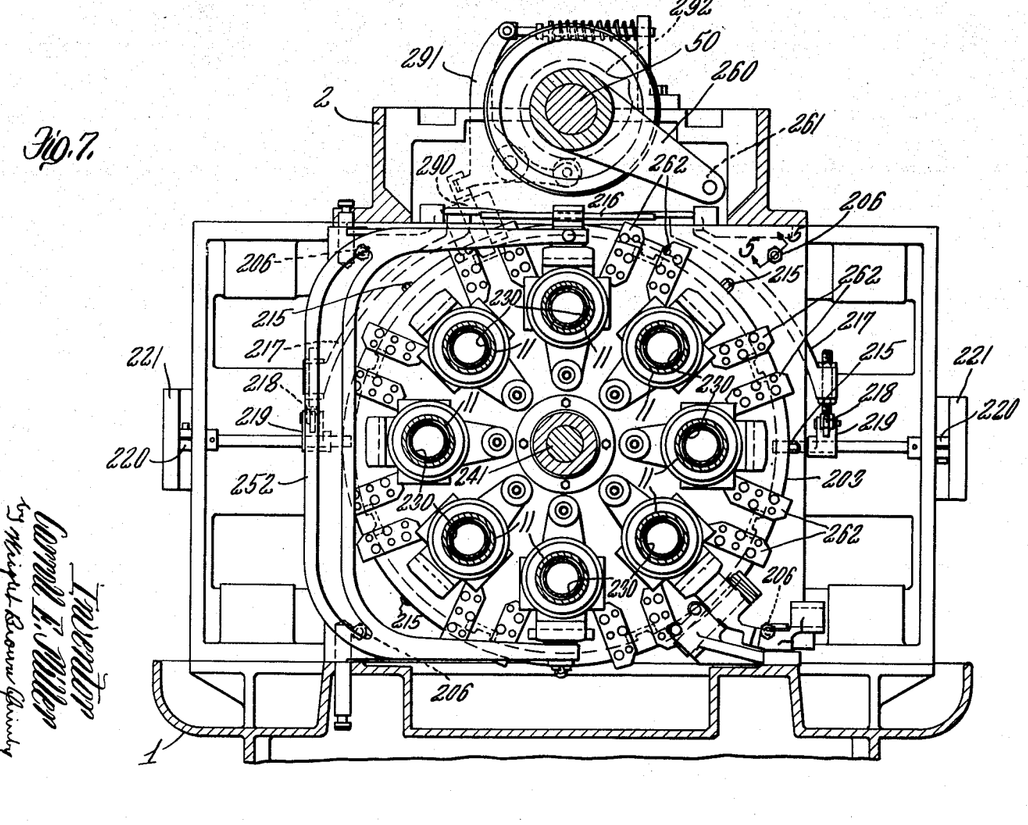
Figures 7 and 8 are sectional views on the correspondingly numbered section lines of Figure 4.

Means are provided in accordance with this invention for taking up the bearings in the work spindle mounting mechanism in an easy and expeditious manner. For this purpose the inner bearing 200 for each spindle (Figure 4) is formed tapered and mates with a correspondingly tapered opening in the adjacent end wall 21 of the turret. The opposite turret wall 202 is mounted for adjustment toward and from the wall 21 and is provided with an end cover plate 203 which engages the rear face of a shoulder member 205 on each spindle 11. This rear wall 202 may be adjusted toward the front plate 21 as by means of a series of threaded rods 206, four being shown in Figure 7, and one of which is shown to a larger scale in Figure 5. Each of these rods is secured as by being threaded into the wall 21 and fixed therein as by means of a check nut 207 and it extends through an opening in the wall 202 and is provided with a nut 208 on its rear end. Adjusting and check nuts 210 are threaded on each rod 206 and bear against the end of a tube 211 through which the rod 206 passes, the opposite end of this tube bearing against the wall member 202. By slackening off on the nuts 210 and tightening up on the nuts 208, the wall 202 may be moved forwardly, thus to tighten up the bearings of the forward ends of the spindles. The plate 203 may have its periphery provided with adjustable stop screws 215 on which may bear the feed limit arms 216 which through the linkage, comprising the arm 217, the link 218, the arm 219, and the stop carrying arm 220, act to determine the position of the arm 220 and its stop relative to a series of individually adjustable stops (Figure 1) on the stop plate 221 shown in Figure 1 in the well known manner to determine for each indexed position of the turret the inner limits of motion of front and rear tool slides, the front slide 199 being shown in Figure 1.

The spindles 11 are provided with the stock feed tubes 230 having their heads 231 normally held against the feed stop disk 232, a portion of the actuating mechanism for these feed tubes being shown at 233. These are actuated from an overhead cam drum on the shaft 50 through a vertical rock arm 235 shown in Figure 2, the top arm of which carries a cam follower 236 controlled by cams 237 on the cam shaft 50. A disk 240 secured to a bar 241 in alinement with the spindle shaft 15 is provided with two cut-outs, one of which is shown at 242 in Figure 2, through which the work feed tubes may be withdrawn from their respective spindles when they come opposite to these cut-outs as the drum is indexed. As shown there are eight spindles. There may be eight separate stations, or two sets of four stations each, as shown in the Cone Patent No. 1,934,620 of November 7, 1933. For the double four arrangement, two oppositely disposed feed tubes are operated simultaneously.

Figures 2, 3:
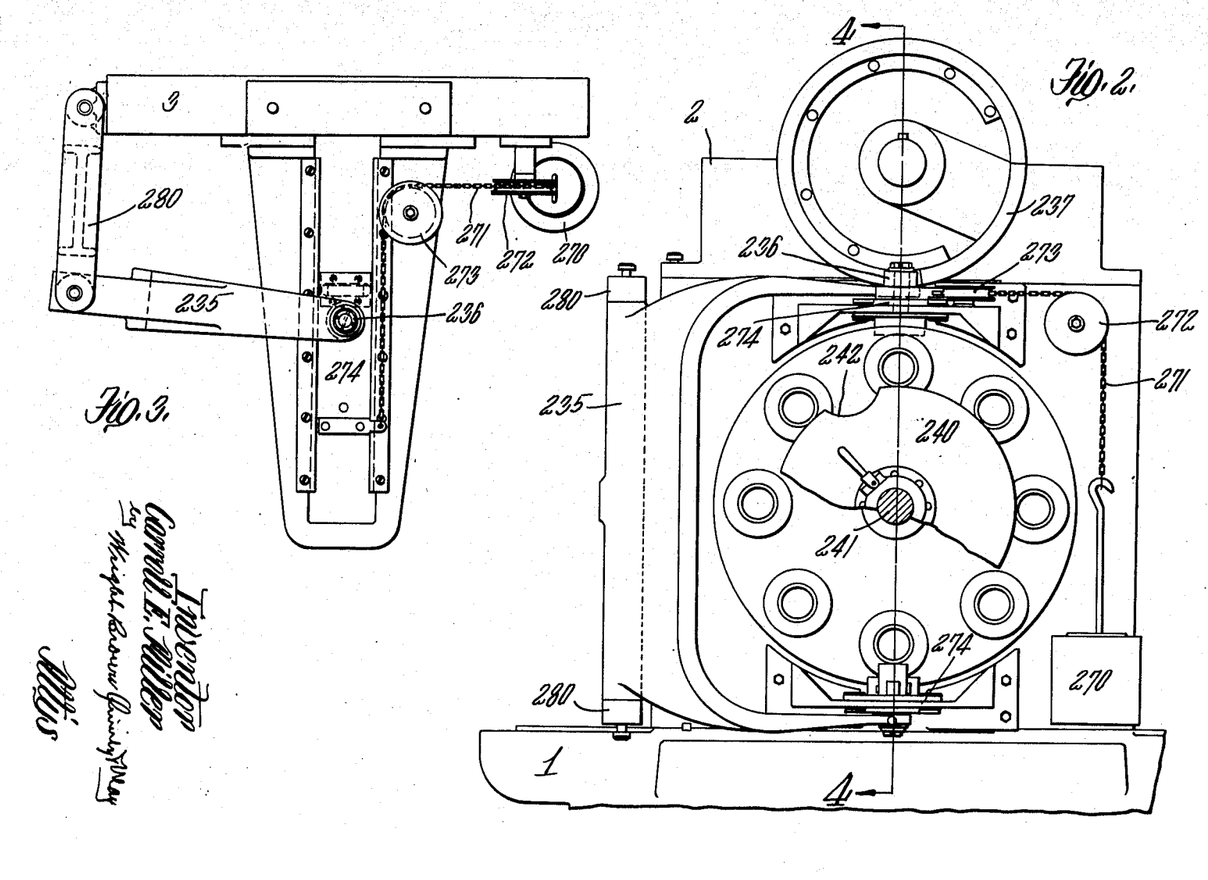
Figure 2 is a rear or left end view of the machine.
Figure 3 is a fragmentary top plan view of the left hand portion of the machine.

The action of the feed tubes for feeding the work is made easier and the follower is held against the cam by a weight 270 which is connected through a chain 271 about the pulleys 272 and 273 with the slide 274, shown best in Figures 2 and 3. This slide 274 has pivoted thereto the arms 235, the upper of which carries the cam follower 236. There is a slide 274 at both the upper and lower portions of the machine so that the machine may be operated as a double four, and to these slides are pivoted the inner ends of the yoke rocker member 235. The outer ends of the yoke 235 are connected to a link 280 which is pivoted at both the top and bottom portions of the yoke 235 and is pivoted at its opposite end to the cross frame member 3. This link connection of the actuating arm 235 permits a straight line motion of the slides 274 so as to produce no lateral forces on the members 233 which actuate the stock feed sleeves. The collect-controlling mechanism is indicated on Figure 4 at 250 actuated by slidable wedge collars 251 controlled in the starting or final indexed positions only, as by means of the actuating pivoted yoke 252 rocked by cams on the drum 253 carried by the cam shaft 50. This yoke 252 has oppositely disposed arms for simultaneous actuation of these collets for the double four spindle arrangement. The drum may be indexed by the rotation of an indexing arm 260 secured to the cam shaft 50 and having a follower 261 (see Figure 7) engaging between the feed blocks 262 on the plate 203. As ordinarily, the turret may be locked in any indexed position as by a locking pin 290 actuated by suitable cam mechanism 291 controlled by cams 292 and 293 which are secured to the shaft 50.

From the foregoing description of a multiple spindle automatic lathe embodying this invention, it will be evident to those skilled in the art that the invention or parts thereof might be embodied in other types of machines, and that various changes and modifications might be made without departing from the spirit and scope of the invention as defined by the appended claims.

I claim:

1. In combination, a work carrier, a tool holder, power means for effecting relative motion between said work carrier and tool holder at a relatively high idle speed and at a relatively low working speed, automatic means for controlling said power means, other means for effecting such motion by power, and operator-actuated control mechanism for said other means by which the direction and amount of such motion may be controlled by the operator at will.

2. In combination, a work carrier, a tool holder, power means for effecting relative motion between said work carrier and tool holder at a relatively high idle speed and at a relatively low working speed, automatic means for controlling said power means, other means for effecting such motion by power, operator-actuated control mechanism for said other means by which the direction and amount of such motion may be controlled by the operator at will, and manual means for producing such motion.

3. In combination, a work carrier, a tool holder, power means for effecting relative motion between said work carrier and tool holder at a relatively high idle speed and at a relatively low working speed, automatic means for controlling said power means, other means for effecting such motion by power, operator-actuated control mechanism for said other means by which the direction and amount of such motion may be controlled by the operator at will, manual means for producing such motion, and interconnections between said other means and said power means requiring the operative disconnection of said power means before said other means may be rendered operative.

4. In combination, a work carrier, a tool holder, power means for effecting relative motion between said work carrier and tool holder at a relatively high idle speed and at a relatively low working speed, automatic means for controlling said power means, other means for effecting such motion by power, operator-actuated control mechanism for said other means by which the direction and amount of such motion may be controlled by the operator at will, and interconnections between said power means and said control mechanism causing the placing of said power means in high speed condition to effect disconnection of said other means.

5. In combination, a work carrier, a tool holder, power means for effecting relative motion between said carrier and holder, said power means operating in one direction, other and reversible means for effecting such motion by power, operator-actuated means controlling said other means, and interconnections between said power means and said controlling means for preventing simultaneous actuation by said power and said other means.

6. In combination, a work carrier, a tool holder, power means for effecting relative motion between said carrier and holder at either of two speeds, said power means operating in one direction, other and reversible means for effecting such motion by power, operator-actuated means controlling said other means, and interconnections between said power means and said controlling means for preventing simultaneous actuation by said power means at its higher speed and said other means.

7. In combination, a work carrier, a tool holder, power means for effecting relative motion between said carrier and holder at either of two speeds, said power means operating in one direction, other and reversible means for effecting such motion by power, operator-actuated means controlling said other means, and interconnections between said power means and said controlling means for preventing simultaneous actuation by said power means at its lower speed and said other means.

8. In combination, a work carrier, a tool holder, power means for producing relative motion between said carrier and holder, other means for effecting such motion, operator-actuated means for controlling said other means, and interconnections between said power means and said controlling means causing actuation of said power means to render inoperative said other means.

9. In combination, a work carrier, a tool holder, a rotary shaft, means actuated by rotation of said shaft for relatively moving said carrier and holder, power means for rotating said shaft in one direction, other power means for rotating said shaft in either selected direction, operator-actuated means for controlling said other power means, and means preventing the operation of both of said power means simultaneously.

10. In combination, a work carrier, a tool holder, a rotary shaft, mechanism operated by the rotation of said shaft for relatively moving said carrier and holder, power means for rotating said shaft in one direction, another power means for rotating said shaft in either direction, and operator-actuated means for controlling said other power means.

11. In combination, a work carrier, a tool holder, a rotary shaft, mechanism operated by the rotation of said shaft for relatively moving said carrier and holder, power means for rotating said shaft in one direction, another power means for rotating said shaft in either direction, operator-actuated means for controlling said other power means, and interconnections between said first-mentioned power means and said control means for insuring against simultaneous effectiveness of both of said power means.

12. In combination, a work carrier, a tool holder, a rotary shaft, mechanism actuated by rotation of said shaft for relatively moving said carrier and holder, power means for rotating said shaft in one direction at a relatively high idle speed and at a relatively low working speed, other power means for rotating said shaft in either direction at a speed intermediate to said idle and working speeds, and operator-actuated means for controlling said other power means.

13. In combination, a work carrier, a tool holder, a rotary shaft, mechanism actuated by rotation of said shaft for relatively moving said carrier and holder, power means for rotating said shaft in one direction at a relatively high idle speed and at a relatively low working speed, other power means for rotating said shaft in either direction at a speed intermediate to said idle and working speeds, operator-actuated means for controlling said other power means, and means controlled by the rotation of said shaft for shifting between said idle and said working speeds.

14. In combination, a work carrier, a tool holder, a rotary shaft, mechanism actuated by rotation of said shaft for relatively moving said carrier and holder, power means for rotating said shaft in one direction at a relatively high idle speed and at a relatively low working speed, other power means for rotating said shaft in either direction at a speed intermediate to said idle and working speeds, operator-actuated means for controlling said other power means, means controlled by the rotation of said shaft for shifting between said idle and said working speeds, and interconnections between said power means and said controlling means for preventing the operation of both of said power means simultaneously.

15. In combination, a turnable turret, a series of rotatable work spindles arranged about the axis of said turret, a tool carrier, a spindle shaft rotatable in the axis of said turret, driving connections from said shaft to said spindles, a cam shaft, cams carried by said shaft, mechanism actuated by certain of said cams for relatively moving said carrier and turret toward and from each other, a power shaft, high speed driving connections including a clutch between said power shaft and said cam shaft, driving connections between said power shaft and said spindle shaft, low speed driving connections including a clutch and an overrunning device between said spindle shaft and said cam shaft, reversible driving connections between said power shaft and said cam shaft, and operator actuable means for selectively controlling said reversible drive connections.

16. In combination, a turnable turret, a series of rotatable work spindles arranged about the axis of said turret, a tool carrier, a spindle shaft rotatable in the axis of said turret, driving connections from said shaft to said spindles, a cam shaft, cams carried by said shaft, mechanism actuated by certain of said cams for relatively moving said carrier and turret toward and from each other, a power shaft, high speed driving connections including a clutch between said power shaft and said cam shaft, driving connections between said power shaft and said spindle shaft, low speed driving connections including a clutch and an overrunning device between said spindle shaft and said cam shaft, reversible driving connections between said power shaft and said cam shaft, operator-actuable means for selectively controlling said reversible drive connections, and interlocking controls between said operator-actuable means and said clutches insuring operation of only one of said driving connections at any one time.

17. A turret mechanism comprising oppositely disposed end wall members, rotary spindles journaled in said wall members, one of said wall members having tapered bearings to receive said spindles, each of said spindles having a shoulder portion operatively engaged by the other of said wall members, and means for adjusting the spacing of said wall members to provide for taking up of wear at said tapered bearings.

18. A turret mechanism comprising oppositely disposed end wall members, rotary spindles journaled in said wall members, one of said wall members having tapered bearings to receive said spindles, each of said spindles having a shoulder portion operatively engaged by the other of said wall members, rods secured to one of said members, and means for adjusting the other wall member along said rods.

19. A multiple spindle lathe comprising a frame, a turret rotatably mounted in said frame, a plurality of work spindles in said turret arranged in circular array about and substantially parallel to the axis of said turret, a stock feeder movable axially of each spindle, a pair of slides movable substantially parallel to said axis, means carried by each slide for operative engagement with one of said feeders in each angular position of said turret, said positions for said slides being substantially diametrically opposite with respect to said axis, a yoke member having its ends pivoted to said slides, a link supporting said yoke member, said link being pivoted at spaced points to said yoke member and being pivoted to said frame, and means for moving one of said slides.

CARROLL E. MILLER.